(12) United States Patent
McIntosh et al.

(10) Patent No.: US 11,399,121 B2
(45) Date of Patent: *Jul. 26, 2022

(54) SYSTEMS AND METHODS FOR SYNCHRONIZING INFORMATION FOR VIDEOS

(71) Applicant: GoPro, Inc., San Mateo, CA (US)

(72) Inventors: Robert McIntosh, San Mateo, CA (US); Andrew Russell, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,615

(22) Filed: Jan. 20, 2021

(65) Prior Publication Data

US 2021/0344814 A1 Nov. 4, 2021

Related U.S. Application Data

(63) Continuation of application No. 15/929,391, filed on Apr. 30, 2020, now Pat. No. 10,924,636.

(51) Int. Cl.
*H04N 5/05* (2006.01)
*H04N 5/10* (2006.01)

(52) U.S. Cl.
CPC ............. *H04N 5/05* (2013.01); *H04N 5/10* (2013.01)

(58) Field of Classification Search
CPC .......... H04N 5/05; H04N 5/10; H04N 9/8205; H04N 21/43072; H04N 21/47205; H04N 21/8547; H04N 5/04; H04N 5/76; G11B 27/10

USPC ......................................................... 348/542
See application file for complete search history.

(56) References Cited

U.S. PATENT DOCUMENTS

| 9,571,797 | B2 | 2/2017 | Kanehira | |
|---|---|---|---|---|
| 10,742,885 | B1 | 8/2020 | Kok | |
| 10,924,636 | B1 * | 2/2021 | McIntosh | H04N 9/8205 |
| 11,216,653 | B2 * | 1/2022 | Kelly | G06V 40/167 |
| 2002/0010917 | A1 * | 1/2002 | Srikantan | H04N 21/4363 725/1 |
| 2002/0056126 | A1 * | 5/2002 | Srikantan | H04L 65/80 725/87 |
| 2007/0130175 | A1 | 6/2007 | Kaneko | |

(Continued)

FOREIGN PATENT DOCUMENTS

KR 100423129 B1 * 3/2004 ......... H04N 21/4104

*Primary Examiner* — Michael Lee
(74) *Attorney, Agent, or Firm* — Esplin & Associates, PC

(57) ABSTRACT

An image capture device may capture video frames while experiencing motion. The video frames may be stored in a visual track, and rotational positions of the image capture device may be stored in a rotational position track. The visual track and the rotational position track may not be temporally aligned. A looping stabilized view of the view frames and a synchronization adjustment option may be presented on a display. The synchronization adjustment option may enable user modification of timing of the rotational positions stored within the rotational position track. Timing modification of the rotational positions may cause changes in the looping stabilized view, which may be used as feedback on whether the synchronization between the visual track and the rotational position track is being improved or not by the timing modification of the rotational positions.

20 Claims, 8 Drawing Sheets

(56) References Cited

U.S. PATENT DOCUMENTS

| | | |
|---|---|---|
| 2010/0091113 A1 | 4/2010 | Morioka |
| 2012/0102078 A1 | 4/2012 | Flick |
| 2012/0251082 A1 | 10/2012 | De Vos |
| 2013/0124984 A1 | 5/2013 | Kuspa |
| 2014/0033250 A1 | 1/2014 | Kennedy |
| 2014/0185877 A1 | 7/2014 | Suzuki |
| 2014/0376873 A1* | 12/2014 | Tanaka ............... H04N 5/44513 386/203 |
| 2015/0077578 A1 | 3/2015 | Iwasaki |
| 2016/0165187 A1 | 6/2016 | Rasheed |
| 2016/0300596 A1 | 10/2016 | Ransdell |
| 2017/0127117 A1 | 5/2017 | Ayers |
| 2017/0180780 A1* | 6/2017 | Jeffries .............. H04N 21/4307 |
| 2018/0077215 A1* | 3/2018 | Mishra ................ H04L 65/4069 |
| 2018/0166102 A1 | 6/2018 | Newman |
| 2018/0240277 A1 | 8/2018 | Wojdala |
| 2018/0288355 A1 | 10/2018 | Minami |
| 2018/0295284 A1 | 10/2018 | Desai |
| 2018/0308241 A1 | 10/2018 | Johnston |
| 2018/0349368 A1 | 12/2018 | Bellingham |
| 2019/0090028 A1* | 3/2019 | Kirley ................ H04N 21/4302 |
| 2020/0177935 A1 | 6/2020 | Takasaki |
| 2021/0083783 A1* | 3/2021 | Stilwell .................... H04R 5/02 |

* cited by examiner

302

304

312

314

322

324

SYSTEMS AND METHODS FOR SYNCHRONIZING INFORMATION FOR VIDEOS

FIELD

This disclosure relates to synchronizing rotational position track of an image capture device with a visual track of a video captured by the image capture device.

BACKGROUND

Information captured for a video may not be synchronized with video data. Information captured for a video, such as camera orientation data, may not be generated at same rate and/or at same time as video data, which may cause misalignment of the camera orientation data with video data. For example, metadata for a video may not be generated at a steady rate during capture of the video. Proper synchronization of metadata with video data may be important for consuming the video. For example, rotational positions of the camera may be recorded during capture of a video, and the video may be stabilized using the rotational positions of the camera. Misalignment of the rotational position data with the video data may result in improper stabilization of the video.

SUMMARY

This disclosure relates to synchronizing information for videos. Visual information defining visual content, associated information for the visual content, and/or other information may be obtained. The visual content may be captured by an image capture device during a capture duration. The visual content may be defined within video frames. The video frames may include a first video frame captured at a first moment within the capture duration, and/or other video frames. The visual information may be stored in a visual track. The associated information may include rotational position information and/or other information. The rotational position information may characterize rotational positions of the image capture device during the capture duration. The rotational positions of the image capture device may include a first rotational position of the image capture device at the first moment within the capture duration, and/or other rotational positions. The rotational position information may be stored in a rotational position track. The rotational position information may be stored at a different rate than the visual information such that the first rotational position of the image capture device stored within the rotational position track is not temporally aligned with the first video frame stored within the visual track.

A looping stabilized view of a subset of the video frames may be presented on a display. The looping stabilized view of the subset of the video frames may include a repeating view of a punchout of the subset of the video frames. The punchout of the subset of the video frames may provide stabilization for the subset of the video frames. The punchout of the subset of the video frames may be determined based on temporal alignment of the rotational position track with the visual track and/or other information. A synchronization adjustment option may be presented on the display. The synchronization adjustment option may enable user modification of timing of the rotational position information stored within the rotational position track. The timing of the rotational position information stored within the rotational position track may be modified based on user interaction with the synchronization adjustment option. The modification of the timing of the rotational position information stored within the rotational position track may change the temporal alignment of the rotational position track with the visual track. The change in the temporal alignment of the rotational position track with the visual track may change the looping stabilized view of the subset of the video frames.

A system that synchronizes information for videos may include one or more electronic storages, one or more processors, and/or other components. An electronic storage may store visual information, information relating to visual content, information relating to image capture device, associated information, rotational position information, information relating to visual track, information relating to rotational position track, information relating to temporal alignment of different tracks, information relating to looping stabilized view, information relating to synchronization adjustment option, information relating to user interaction with synchronization adjustment option, and/or other information.

The processor(s) may be configured by machine-readable instructions. Executing the machine-readable instructions may cause the processor(s) to facilitate synchronizing information for videos. The machine-readable instructions may include one or more computer program components. The computer program components may include one or more of a visual information component, an associated information component, a view component, a synchronization component, and/or other computer program components.

The visual information component may be configured to obtain visual information and/or other information. The visual information may define visual content. The visual content may have been captured by an image capture device during a capture duration. The visual content may be defined within video frames of a video. The video frames may include a first video frame captured at a first moment within the capture duration, and/or other video frames. The visual information may be stored in a visual track.

The associated information component may be configured to obtain associated information for the visual content. The associated information may include rotational position information and/or other information. The rotational position information may characterize rotational positions of the image capture device during the capture duration. The rotational positions of the image capture device may include a first rotational position of the image capture device at the first moment within the capture duration, and/or other rotational positions. The rotational position information may be stored in a rotational position track. The rotational position information may be stored at a different rate than the visual information such that the first rotational position of the image capture device stored within the rotational position track is not temporally aligned with the first video frame stored within the visual track.

In some implementations, the visual information may be stored at a consistent rate such that a single video frame is stored for a time duration, and the rotational position information being stored at the different rate than the visual information may include the rotational position information not being stored at the consistent rate. In some implementations, the rotational position information not being stored at the consistent rate may include a rate of storage of the rotational position information changing within the capture duration.

The view component may present a looping stabilized view of a subset of the video frames on a display. The looping stabilized view of the subset of the video frames may include a repeating view of a punchout of the subset of the video frames. The punchout of the subset of the video frames may provide stabilization for the subset of the video frames. The punchout of the subset of the video frames may be determined based on temporal alignment of the rotational position track with the visual track, and/or other information.

The synchronization component may be configured to present a synchronization adjustment option on the display. The synchronization adjustment option may enable user modification of timing of the rotational position information stored within the rotational position track. The timing of the rotational position information stored within the rotational position track may be modified based on user interaction with the synchronization adjustment option. The modification of the timing of the rotational position information stored within the rotational position track may change the temporal alignment of the rotational position track with the visual track. The change in the temporal alignment of the rotational position track with the visual track may change the looping stabilized view of the subset of the video frames.

In some implementations, the synchronization adjustment option may be activated with respect to a synchronization marker. The synchronization marker may define an instance of a fixed temporal alignment between a point along the visual track and a point along the rotational position track. In some implementations, the instance of the fixed temporal alignment between the point along the visual track and the point along the rotational position track defined by the synchronization marker may be determined based on identification of a shaky moment within the rotational position track and one or more corresponding video frames within the visual track. The one or more corresponding video frames within the visual track may be identified based on matching of movement of pixels within the one or more corresponding video frames with movement of the image capture device at the shaky moment.

In some implementations, the synchronization adjustment option may include a slider movable between a first end and a second end. The modification of the timing of the rotational position information stored within the rotational position track based on the user interaction with the synchronization adjustment option may include change in speed of the rotational position track adjacent to the synchronization marker based on movement of the slider between the first end and the second end. For example, responsive to the slider being moved towards the first end, the speed of the rotational position track preceding the synchronization marker may be increased. Responsive to the slider being moved towards the second end, the speed of the rotational position track preceding the synchronization marker may be decreased. In some implementations, responsive to the slider being moved towards the first end, the speed of the rotational position track following the synchronization marker may be decreased. Responsive to the slider being moved towards the second end, the speed of the rotational position track following the synchronization marker may be increased.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
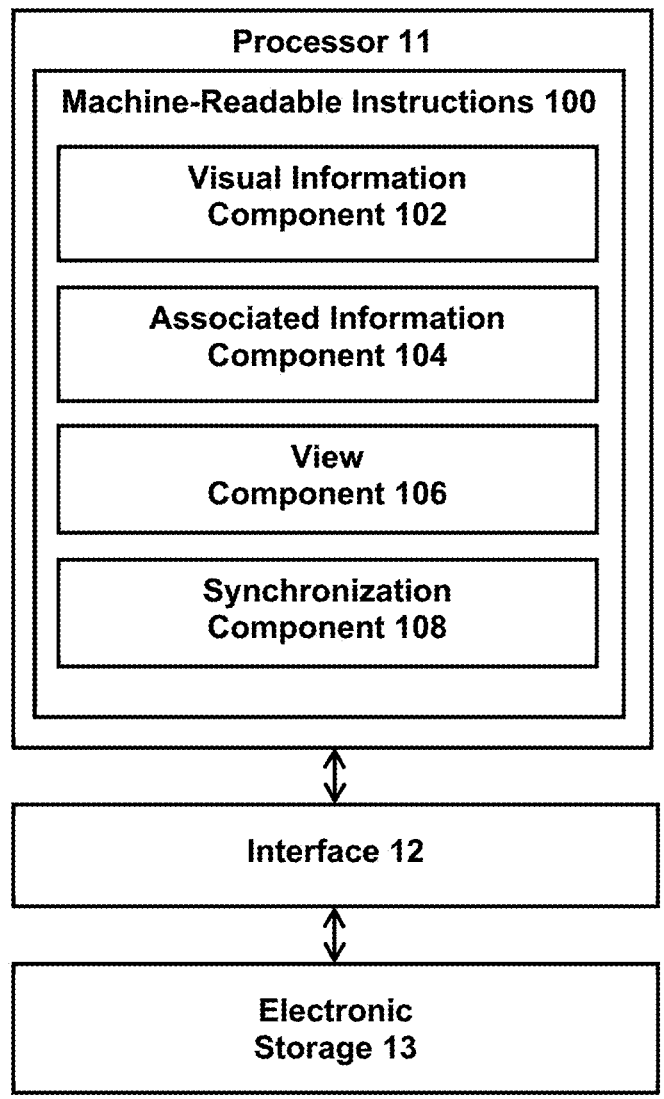
FIG. 1 illustrates an example system that synchronizes information for videos.

FIG. 1 illustrates a system 10 for synchronizing information for videos. The system 10 may include one or more of a processor 11, an interface 12 (e.g., bus, wireless interface), an electronic storage 13, and/or other components. Visual information defining visual content, associated information for the visual content, and/or other information may be obtained by the processor 11. The visual content may be captured by an image capture device during a capture duration. The visual content may be defined within video frames. The video frames may include a first video frame captured at a first moment within the capture duration, and/or other video frames. The visual information may be stored in a visual track. The associated information may include rotational position information and/or other information. The rotational position information may characterize rotational positions of the image capture device during the capture duration. The rotational positions of the image capture device may include a first rotational position of the image capture device at the first moment within the capture duration, and/or other rotational positions. The rotational position information may be stored in a rotational position track. The rotational position information may be stored at a different rate than the visual information such that the first rotational position of the image capture device stored within the rotational position track is not temporally aligned with the first video frame stored within the visual track.

A looping stabilized view of a subset of the video frames may be presented by the processor 11 on a display. The looping stabilized view of the subset of the video frames may include a repeating view of a punchout of the subset of the video frames. The punchout of the subset of the video frames may provide stabilization for the subset of the video frames. The punchout of the subset of the video frames may be determined by the processor 11 based on temporal alignment of the rotational position track with the visual track and/or other information. A synchronization adjustment option may be presented by the processor 11 on the display. The synchronization adjustment option may enable user modification of timing of the rotational position information stored within the rotational position track. The timing of the rotational position information stored within the rotational position track may be modified based on user interaction with the synchronization adjustment option. The modification of the timing of the rotational position information stored within the rotational position track may change the temporal alignment of the rotational position track with the visual track. The change in the temporal alignment of the rotational position track with the visual track may change the looping stabilized view of the subset of the video frames.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to image capture device, associated information, rotational position information, information relating to visual track, information relating to rotational position track, information relating to temporal alignment of different tracks, information relating to looping stabilized view, information relating to synchronization adjustment option, information relating to user interaction with synchronization adjustment option, and/or other information.

A video may include video content captured by an image capture device during a capture duration. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Video content may have a progress length. Progress length may be measured/defined in terms of time durations and/or frame numbers. The progress length of the video content may correspond to the capture duration. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content).

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length (duration, number of frames) of the video. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device. A field of view of visual content may define a field of view of a scene captured within the visual content. A field of view of visual content may refer to an extent of a scene captured and/or viewable within the visual content. A field of view of visual content may refer to a part of a scene from which light is received for generation of the visual content. For example, the video may include a wide field of view video, such as a panoramic video or a spherical video, and the field of view may of the spherical video may include a wide field of view (e.g., greater than 120 degrees, 360 degrees). Other fields of view are contemplated Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

The sound(s) within the audio content may correspond to the sound(s) that were captured when capturing the visual content. For example, the visual content may include a visual capture of an activity involving one or more persons and the audio content may include sound capture of the activity, which may include sounds produced by persons or non-persons (e.g., animals, machines, objects). One or more portions of the audio content may include capture of voice of one or more persons and/or other sounds. Voice may refer to vocal sounds made by a person. Voice may be directed to one or more persons or one or more non-persons. Voice may include part of a spoken word/sound, one or more spoken words/sounds, and/or other vocal sounds. For example, voice may include speech, singing, shouting, cheering, yelling, screaming, booing, and/or other voice.

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device.

An image capture device may refer to a device captures visual content and/or other content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). An image capture device may include one or more optical elements, one or more image sensors, one or more processors, and/or other components. An optical element may guide light within a field of view to an image sensor. The image sensor may generate a visual output signal conveying visual information defining visual content based on light that becomes incident thereon.

The image capture device may include one or more position sensors. A position sensor may include sensor(s) that measures experienced positions and/or motions. The position sensor may convert experienced positions and/or motions into an output signal. The output signal may include one or more electrical signals. For example, the position sensor may refer to a set of position sensors, which may include one or more inertial measurement units, one or more accelerometers, one or more gyroscopes, and/or other position sensors. The position sensor may generate a position output signal conveying information that characterizes positions and/or motions of the position sensor and/or device(s) carrying the position sensor, such as the image capture device.

For example, the position sensor may be configured to generate a position output signal based on positions of the image capture device during the capture duration. The position output signal may convey position information of the image capture device. The position information may characterize positions of the image capture device 302 at different moments (points in time, time durations) within the capture duration. Positions of the image capture device may include rotational positions, translational positions, and/or other positions. In some implementations, the position information may characterize the positions of the image capture device during the capture duration based on the position information including rotational position information, translational position information, and/or other position information. The rotational position information may characterize rotational positions of the image capture device during the capture duration. The translational position information may characterize translational positions of the image capture device during the capture duration. In some implementations, the position information may characterize the positions of the image capture device during the capture duration further based on the position information including acceleration information and/or other information. The acceleration information may characterize accelerations of the image capture device during the capture duration.

Position of an image capture device may refer to how the image capture device is oriented. For example, rotational positions of an image capture device may refer to how the image capture device is oriented/rotated around one or more axis or one or more point, such as a center point. For instance, rotational positions of an image capture device may refer to how the image capture device is rotated about one or more of yaw axis, pitch axis, and/or roll axis while capturing video content. Rotational position information of an image capture device may characterize how the image capture device is rotated (e.g., amount of rotations about the yaw, pitch, and/or roll axis) and/or is being rotated (e.g., speed and/or direction of rotations) at different moments within a capture duration. Translational positions of an image capture device may refer to locations of the image capture device with respect to one or more fixed points. For instance, translational positions of an image capture device may refer to how the image capture device is moving along one or more translational direction (e.g., moving forward, backward, laterally) while capturing video content. Translational position information of an image capture device may characterize how the image capture device is displaced (GPS location) and/or is being displaced (e.g., speed and/or direction of translational displacement) at different moments within a capture duration.

The position information may characterize positions of the image capture device 302 based on specific translational and/or rotational positions of the image capture device and/or based on changes in translational and/or rotational positions of the image capture device as a function of progress through the capture duration. That is, the position information may characterize translational and/or rotational positions of the image capture device and/or changes in translational and/or rotational positions (motion) of the image capture device (e.g., direction, amount, velocity, acceleration) during the capture duration. The position information may include rotational position information characterizing rotational position of the image capture device, translational position information characterizing translational position of the image capture device, and/or other position information.

Different types of information for a video may be stored in same or different tracks of the video. For example, visual information may be stored within one or more visual tracks of a video. Audio information may be stored with and/or separate from the visual information. For example, audio information may be stored within one or more audio tracks of a video, which may be separate from the visual track(s) of the video. The video may include one or more metadata tracks to store metadata information for the video. For example, the video may include one or more position tracks to store position information for the video. For instance, rotational position information for the video may be stored in a rotational position track of the video. Other tracks are contemplated.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate synchronizing information for videos. The machine-readable instructions 100 may include one or more computer program components. The machine-readable instructions 100 may include one or more of a visual information component 102, an associated information component 104, a view component 106, a synchronization component 108, and/or other computer program components.

The visual information component 102 may be configured to obtain visual information and/or other information. Obtaining visual information may include one or more of accessing, acquiring, analyzing, determining, examining, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device).

In some implementations, the visual information component 106 may obtain visual information based on user interaction with a user interface/application (e.g., video editing application, video player application), and/or other information. For example, a user interface/application may provide option(s) for a user to select visual content to be stabilized. The visual information defining the visual content may be obtained based on the user's selection of the visual content/video through the user interface/video application. Other selections of visual content/video for retrieval of visual information are contemplated.

The visual information may be stored in a visual track of the video. The visual information may define visual content. The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of video frames of the video. Other types of visual information are contemplated.

The visual content may have been captured by an image capture device during a capture duration. The visual content may be defined within video frames of a video. The video may include multiple video frames, with different video frames corresponding to different points/moments within the progress length of the video. The video frames may include different video frames captured at different moments (points in time, durations of time) within the capture duration. For example, the video frames may include a video frame captured at a particular moment within the capture duration, and/or other video frames captured at other moments within the capture duration.

The image capture device may have experienced translational motion and/or rotational motion during capture of the visual content. For the image capture device may have been carried by a person, an animal, or a vehicle during capture of the visual content. The image capture device may have been unintentionally moved during capture of the visual content. For example, the image capture device may have been rotated due to vibration and/or unsteady carrying of the image capture device. Such motion of the image capture device may cause playback of the video to appear jerky or shaky.

The associated information component 104 may be configured to obtain associated information for the visual content. Obtaining associated information may include one or more of accessing, acquiring, analyzing, determining, examining, identifying, loading, locating, opening, receiving, retrieving, reviewing, selecting, storing, and/or otherwise obtaining the associated information. The associated information component 104 may obtain associated information from one or more locations. For example, the associated information component 104 may obtain associated information from a storage location, such as the electronic storage 13, electronic storage of information and/or signals generated by one or more sensors, electronic storage of a device accessible via a network, and/or other locations. The associated information component 104 may obtain associated information from one or more hardware components (e.g., a position sensor, an audio sensor) and/or one or more software components (e.g., software running on a computing device).

Association information for the visual content may refer to information associated with the visual content. Associated information for the visual content may refer to information that facilitates consumption (e.g., viewing) of the visual content. Associated information for the visual content may have been generated with or after the capture of the visual content. For example, associated information for the visual content may include positional information (e.g., rotational position information, translational position information) of the image capture device that captured the visual content, audio information defining audio content (e.g., captured with the visual content and/or to be provided as accompaniment for the visual content), other visual information defining other visual content (e.g., separate visual content to be presented with the visual content), and/or other associated information. Other types of associated information for the visual content are contemplated.

Associated information may be stored in one or more tracks separate from the visual track of the video. For example, the associated information may include rotational position information of the image capture device that captured the visual content, and the rotational position information may be stored in a rotational position track of the video.

The rotational position information may characterize rotational positions of the image capture device during the capture duration. The rotational position information may characterize rotational positions of the image capture device by including information that characterizes one or more content, qualities, attributes, features, and/or other aspects of the rotational positions of the image capture device. For example, the rotational position information may characterize rotational positions of the image capture device by including information that specifies the rotational positions of the image capture device and/or information that is used to determine the rotational positions of the image capture device. Other types of rotational position information are contemplated.

The rotational positions of the image capture device may have been determined (e.g., measured) during the capture duration. The rotational positions of the image capture device may include different rotational positions corresponding to different points/moments within the progress length of the video. The rotational positions of the image capture device may include different rotational positions of the image capture device determined at different moments (points in time, durations of time) within the capture duration. For example, the rotational positions of the image capture device may include a rotational position of the image capture device at a particular moment within the capture duration, and/or other rotational positions at other moments within the capture duration. The particular moment may correspond to a moment when a video frame was captured by the image capture device.

Associated information may be stored in one or more corresponding tracks at a different rate than the storage of visual information in the visual track(s). Storage of the associated information using a different rate than storage of the visual information may result in temporal misalignment of the associated information stored in the corresponding track(s) and the visual information stored in the visual track(s). Temporal misalignment of the associated information stored in the corresponding track(s) and the visual information stored in the visual track(s) may result in associated information for a particular moment (within the capture duration, within the progress length) of the video not lining up with the visual information for the particular moment.

For example, the visual information may be stored at a consistent rate in the visual track such that a single video frame is stored for a time duration of the visual track. For example, a single video frame may be stored in the visual track for every 1/30 of a second of the video (resulting in 30 video frames being stored in the visual track for every second of the video). The associated information may not be stored in the corresponding track(s) at the consistent rate which visual information is stored in the visual track(s). The associated information may be stored at a different rate in the corresponding track(s) than the rate at which the visual information is stored in the visual track(s).

For example, the rotational position information may be stored in a rotational position track at a different rate than the consistent rate at which the visual information is stored. The rotational position information being stored at a different rate than the consistent rate at which the visual information is stored may include the rotational position information being stored at a different consistent rate. For instance, a single rotational position of the image capture device may be stored in the rotational track for a time duration different than the storage of the video frames (a single rotational position stored in the rotational position track for every 1/40 of a second of the video).

As another example, the rotational position information being stored at a different rate than the consistent rate at which the visual information is stored may include the rate of storage of the rotational position information changing within the capture duration. That is, rather than the rotational position information being stored (e.g., determined, measured, recorded) in the rotational position track at a consistent rate, the rate of storage may change (e.g., increase, decrease) during the capture duration.

Such storage of the rotational position information may result in temporal misalignment of the visual information stored in the visual track(s) with the rotational position information stored in the rotational position track(s). That is, the rotational positions stored in a rotational position track may not temporally line up with video frames stored in a visual track. For example, a video frame for a particular moment in the video may not temporally line up with the rotational position of the image capture device at the particular moment.

Temporal misalignment of the visual track and the rotational position track may include at least one of the video frames in the visual track and at least one of the rotational positions in the rotational position track not being temporally aligned. Proper temporal alignment of the visual track and the rotational position track may refer to video frames in the visual track being aligned with the rotational positions of the image capture device at moments when the video frames were captured so that corresponding rotational positions are read and/or used for consumption (e.g., presentation) of the video frames.

Temporal misalignment of the associated information stored in the corresponding track(s) and the visual information stored in the visual track(s) may result in associated information for a particular moment (within the capture duration, within the progress length) of the video not lining up with the visual information for the particular moment. Such temporal misalignment may result in wrong associated information being read and/or used for consumption of the visual content. For example, rotational positions of the image capture device may be used to stabilize the visual content, and temporal misalignment of the video frames in a video track with rotational positions of the image capture device in a rotational position track may result in wrong rotational positions of the image capture device being read and/or used to stabilize the visual content, which may cause improper stabilization of the visual content. Improper stabilization of the visual content may result in the visual content being stabilized less than when using temporally aligned tracks (e.g., less shakiness removed) or more motion being introduced into the visual content (e.g., visual content becoming shakier).

Figure 3A:
FIGS. 3A, 3B, and 3C illustrate example visual tracks and rotational position tracks.
Figure 3A:
Figure 3B:
Figure 3B:
Figure 3C:
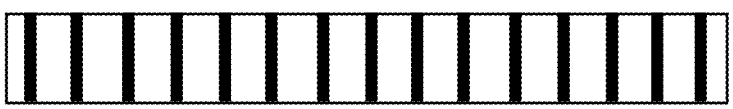
Figure 3C:

FIGS. 3A, 3B, and 3C illustrate example temporal misalignment visual tracks and rotational position tracks. FIG. 3A includes example visualization of fifteen video frames stored in a visual track 302 and fifteen rotational positions of image capture device stored in a rotational position track 304. The fifteen rotational positions may reflect the rotational positions of the image capture device at moments when the fifteen video frames were captured by the image capture device. Information contained within the visual track 302 and the rotational position track 304 may be temporally misaligned such that the fifteen video frames are not temporally aligned with the fifteen corresponding rotational positions. For example, the fifteen corresponding rotational positions may be recorded late in the rotational position track.

FIG. 3B includes example visualization of fifteen video frames stored in a visual track 312 and eighteen rotational positions of image capture device stored in a rotational position track 314. Fifteen of the eighteen rotational positions may reflect the rotational positions of the image capture device at moments when the fifteen video frames were captured by the image capture device. Information contained within the visual track 312 and the rotational position track 314 may be temporally misaligned such that the fifteen video frames are not temporally aligned with the fifteen corresponding rotational positions. For example, the fifteen corresponding rotational positions may be spaced apart using shorter durations than the fifteen video frames. The speed of the rotational position track 314 may be faster than the speed of the visual track 312.

FIG. 3C includes example visualization of fifteen video frames stored in a visual track 322 and fifteen rotational positions of image capture device stored in a rotational position track 324. Some of the fifteen rotational positions may reflect the rotational positions of the image capture device at moments when some of the fifteen video frames were captured by the image capture device. Information contained within the visual track 322 and the rotational position track 324 may be temporally misaligned such that the fifteen video frames are not temporally aligned with the fifteen corresponding rotational positions. For example, the fifteen corresponding rotational positions may be spaced apart using different durations than the fifteen video frames. The eighth video frame of the visual track 322 may be temporally aligned with the eight rotational position of the rotational position track 324. The speed of the rotational position track 324 may be slower than the speed of the visual track 312 in the first half of the tracks and the speed of the position track 324 may be faster than the speed of the visual track 312 in the second half of the tracks.

The view component 106 may present a looping stabilized view of a subset of the video frames on a display. A display may refer an electronic display for visually presenting information. A subset of the video frames may include less than all of the video frames. A subset of the video frames may include a number of video frames to provide playback of a certain duration of the video. For example, the subset of the video frames may include sufficient number of video frames to provide playback of one-second of video. Other durations of video playback are contemplated.

A looping stabilized view of the subset of the video frames may include a repeating view of the subset of the video frames. A repeating view of the subset of the video frames may include a punchout of the subset of the video frames. The punchout of the subset of the video frames may provide stabilization for the subset of the video frames. Portions of the video frames that are punched out for view may provide stabilization for the video so that the content of the video frames appears to be more stable (includes less frame-to-frame motion) than if the entirety of the video frames are presented. That is, rather than using the entire visual content contained within the video frames, one or more portions of the video frames may be punched out (using a viewing window) to provide stabilization of the visual content within the video frames. Stabilization of visual content may be performed based on placement of the viewing window within the field of view of the visual content. Stabilization of visual content may include using smaller spatial extents of the visual content to provide a punchout view of the visual content that creates a more stable view than when viewing the entirety of the visual content.

A punchout of video frames may refer to an output of one or more portions of the video frames for presentation. A punchout of video frames may refer to extents of the video frames that is obtained for viewing and/or extraction. The extents of the video frames viewable/extracted within the viewing window may be used to provide views of different spatial extents of the video frames. Inclusion of the extent(s) of the video frames within the punchout/viewing window may effectuate stabilization of the video frames via selective cropping.

The placement of the punchout/viewing window within the field of view of the video frames/visual content may compensate for the motion (e.g., unintentional motion) of the image capture device during the capture duration. The placement of the punchout/viewing window may reduce, remove, and/or smooth the motion present in the video frames/visual content due to different translational and/or rotational positions of the image capture device when it captured the visual content. For example, a punchout/viewing window having a smaller size than the field of view of the video frames/visual content may be used to provide a punchout of the video frames/visual content. The punchout (cropped view) may be moved within the field of view to provide a stabilized view of the video frames/visual content.

The punchout/viewing window may be oriented with respect to the field of view of the video frames/visual content to provide a punchout of the video frames/visual content that is stable/smooth with respect to prior and/or next punchout of the video frames/visual content. For example, the punchout/viewing window may be oriented with respect to the field of view of video frames captured by the image capture device to provide a punchout of the video frames such that the visual content within the viewing window appears to have been captured with a stable/more stable image capture device (e.g., a punchout of a video frame being stable/more stable with a punchout of the preceding video frame and/or a subsequent video frame).

Determining placement of the punchout/viewing window within the field of view of the video frames/visual content (orientation of the punchout/viewing window with respect to the field of view of the video frames/visual content) may including determining rotation of the punchout/viewing window within the field of view based on the positions of the image capture device during the capture duration. The punchout/viewing window may be rotated to compensate for rotation of the image capture device during capture duration. For example, vibration of the image capture device may have caused the image capture device to rotate to the right by an angle during capture of a video frame. To compensate for the rotation of the image capture device, the punchout/viewing window may be rotated to the left by the angle so that the visual content within the punchout/viewing window does not show the rotation of the image capture device. The rotational positions in the rotational position track may be used to determine how the punchout/viewing window is to be rotated to reduce the amount of motion in the visual content due to rotation of the image capture device during capture of the video frames.

In some implementation, the size of the punchout/viewing window may change based on the rotation of the punchout/viewing window. The size of the punchout/viewing window may be changed to increase (e.g., maximize) the amount of pixels that may be used to present the stabilized view. The size of the punchout/viewing window may be changed to avoid the punchout/viewing window extending beyond the field of view of the video frame/visual content (extending beyond borders of the video frames). For example, the size of the punchout/viewing window may be larger for moments when the punchout/viewing window is rotated by small amounts and the size of the punchout/viewing window may be smaller for moments when the punchout/viewing window is rotated by large amounts.

In some implementation, the extent to which the size of the punchout/viewing window may change may vary. The extent to which the size of the punchout/viewing window may change may vary based on amount of movement experienced by the image capture device. Varying the extent to which the size of the punchout/viewing window may change may provide for dynamic stabilization of the visual content, where the extent/type of stabilization performed on the visual content changes based on shakiness of the image capture device that captured the visual content. For example, the size of the punchout/viewing window may be limited from becoming smaller than a minimum size. When and/or as the size of the punchout/viewing window decreases to approach the minimum size, the stabilization strength may be reduced to allow more movement (e.g., shakiness) to exist within the stabilized visual content. When and/or as the size of the punchout/viewing window increases, the stabilization strength may be increased to decrease the amount of movement (e.g., shakiness) that exists within the stabilized visual content.

For the looping stabilized view, the viewing window/punchout of the subset of the video frames may be determined based on temporal alignment of the rotational position track with the visual track, and/or other information. The viewing window/punchout of the subset of the video frames may be determined based on temporal alignment of rotational positions of the image capture device stored in the rotational position track with the video frames stored in the visual track. That is, for a particular video frame within the visual track, the viewing window/punchout of the subset of the video frames may be determined based the rotational position in the rotational position track temporally aligned with the particular video frame. The rotational position temporally aligned with a particular video frame may include a rotational position specified in the rotational position track or a rotational position interpolated using multiple rotational positions specified in the rotational position track.

Temporal misalignment of the rotational positions of the image capture device stored in the rotational position track with the video frames stored in the visual track may result in improper stabilization of the subset of the video frames (e.g., less shakiness removed from the view, the view becoming shakier). Proper alignment of the rotational positions of the image capture device stored in the rotational position track with the video frames stored in the visual track may result in better stabilization of the subset of the video frames (e.g., more shakiness removed from the view, the view becoming more stable). Thus, the quality of stabilization provided by the looping stabilized view may indicate the extent to which the temporal alignment between the rotational position track and the visual track is proper. Better stabilization may be provided with more accurate temporal alignment between the visual track and the rotational position track, and worse stabilization may be provided with greater misalignment between the visual track and the rotational position track.

In some implementations, one or more parameters may be used to change stabilization of video frames. The parameter(s) may be controlled/set by users to change the stabilization of the video frames. For example, parameters that control stabilization of the video frames may include a smoothness parameter, a cropping speed parameter, a horizon-lock parameter, and/or other parameters. The smoothness parameter may define strength of stabilization to be applied to the video frames. Strength of the stabilization may determine the size of the viewing window/punchout used to stabilize the visual content and/or how the viewing window/punchout moves within the field of view of view of the visual content to provide stabilization. The cropping speed parameter may define the speed with which the size of the viewing window/punchout changes. In some implementation, the cropping speed parameter may be linked with the smoothness parameter such that change one parameter results in change to the other parameter. The linkage of be a two-way linkage (change in either parameter results in change in the other parameter) or a one-way linkage (change in the smoothness parameter results in changes in the cropping speed parameter, but not vice versa). For example, low value of the smoothness parameter (low stabilization strength) may result in high value of the cropping speed parameter (fast cropping speed), while high value of the smoothness parameter (high stabilization strength) may result in low value of the cropping speed parameter (slow cropping speed).

The synchronization component 108 may be configured to present a synchronization adjustment option on the display. A synchronization adjustment option may refer to one or more graphical elements presented on the display, such as graphical element(s) of one or more user interfaces. The synchronization adjustment option may enable a user to provide input to the system 10 to change temporal alignment of information stored within different tracks. For example, the synchronization adjustment option may enable a user to provide input to the system 10 to change temporal alignment of video frames stored in the visual track and the rotation positions of image capture device stored in the rotational position track. The synchronization adjustment option may enable a user synchronize/improve synchronization of visual information with associated information.

The synchronization adjustment option may enable user modification of timing of information stored within one or more tracks. For example, the synchronization adjustment option may enable user modification of timing of the rotational position information stored within the rotational position track. A user may interact with the synchronization adjustment option to provide input on how the timing of the rotational position information is to be changed. The timing of the rotational position information stored within the rotational position track may be modified based on user interaction with the synchronization adjustment option.

Modification of the timing of information stored within a track may include change in time points of the video to which the information in the track corresponds. For example, modification of the timing of the rotational positions stored in the rotational position track may include adjustment of the video times associated with the rotational positions (e.g., adding a time value to the associated video times, subtracting a time value from the associated video times). For instance, the timing of the rotational positions stored in the rotational position track may be modified by shifting the individual times forward in time or backwards in time.

Modification of the timing of information stored within a track may include change in speed of the track. The speed of the track may define the rate at which information within the track is used for consumption of the visual content. For example, modification of the timing of the rotational positions stored in the rotational position track may include increasing or decreasing the speed of the rotational position track. For instance, speed of one portion of the rotational position track may be increased while speed of another portion of the rotational position track may be decreased.

Modification of the timing of information stored within a track may change correspondence between the information in the track and the video frames in the visual track. User interaction with the synchronization adjustment option may cause retiming of information in the track with the video frames in the visual track. For example, modification of the timing of the rotational position information stored within the rotational position track may change the temporal alignment of the rotational position track with the visual track. Change in the temporal alignment of the rotational position track with the visual track may change the looping stabilized view of the subset of the video frames. That is, by changing correspondence between the rotational positions in the rotational position track and the video frames in the visual track, the stabilization of the video frames may be performed differently. Before the change in temporal alignment of the rotational position track with the visual track, the placement of the punchout/viewing window for a video frame may be determined based on one particular rotational position, while after the change in temporal alignment of the rotational position track with the visual track, the placement of the punchout/viewing window for a video frame may be determined based on a different rotational position. Change in the looping stabilized view (change in stabilization result) may provide feedback on whether the change in temporal alignment of the rotational position track with the visual track improved or worsened the accuracy of temporal alignment of the rotational position track with the visual track. Change in temporal alignment of the rotational position track with the visual track that leads to more accurate synchronization of the rotational position track with the visual track may result in better stabilization being provided by the looping stabilized view. Change in temporal alignment of the rotational position track with the visual track that leads to less accurate synchronization of the rotational position track with the visual track may result in worse stabilization being provided by the looping stabilized view.

In some implementations, the synchronization adjustment option may be activated with respect to a synchronization marker. A synchronization marker may define an instance of a fixed temporal alignment between points along different tracks. For example, a synchronization marker may define an instance of a fixed temporal alignment between a point along the visual track and a point along the rotational position track. A fixed temporal alignment may refer to a temporal alignment that is not changed based on user interaction with the synchronization adjustment option. For example, a synchronization marker may define an instance of a fixed temporal alignment between a video frame in the visual track and a rotational position of the image capture device in the rotational position track. The fixed temporal alignment between a video frame in the visual track and a rotational position of the image capture device in the rotational position track may not change when the user interacts with the synchronization adjustment option.

In some implementations, an instance of a fixed temporal alignment between a point along the visual track and a point along the rotational position track defined by a synchronization marker may be determined based on identification of a shaky moment within the rotational position track and one or more corresponding video frames within the visual track. A shaky moment within the rotational position track may refer to a duration of time in the rotational position track with certain changes in rotational positions of the image capture device. The changes in rotational positions of the image capture device over the duration may indicate that the image device was shaking. The video frame(s) within the visual track corresponding to the shaking moment may be identified based on matching of movement of pixels within the corresponding video frame(s) with movement of the image capture device at the shaky moment. That is, the corresponding video frame(s) may be identified by matching the movement of the image capture device indicated by the rotational position track with movement of the visual content of the video frames.

In some implementations, movement of the pixels may be determined using optical flow. Matching of movement of pixels within the corresponding video frame(s) with movement of the image capture device at the shaky moment may include matching vectors of the optical flow with movement of the image capture device at the shaky moment. In some implementation, intrinsic parameters of the image capture device may be used to facilitate matching pixel movement indicated by optical flow with image capture device movement. For example, intrinsic parameters of the image capture device may be used to build a lens model, and the lens model may be used to project the optical flow into a different type of view. For example, the optical element may include a wide-angle lens, which may provide a fisheye view of the visual content. The optical flow obtained from the fisheye view of the visual content may be run through the lens model and/or other models (e.g., rolling shutter model) to project the optical flow in a rectilinear view. The vectors of the optical flow in the rectilinear view may be compared with the image capture device movement to identity video frame(s) corresponding to the shaky moment.

Figure 4:
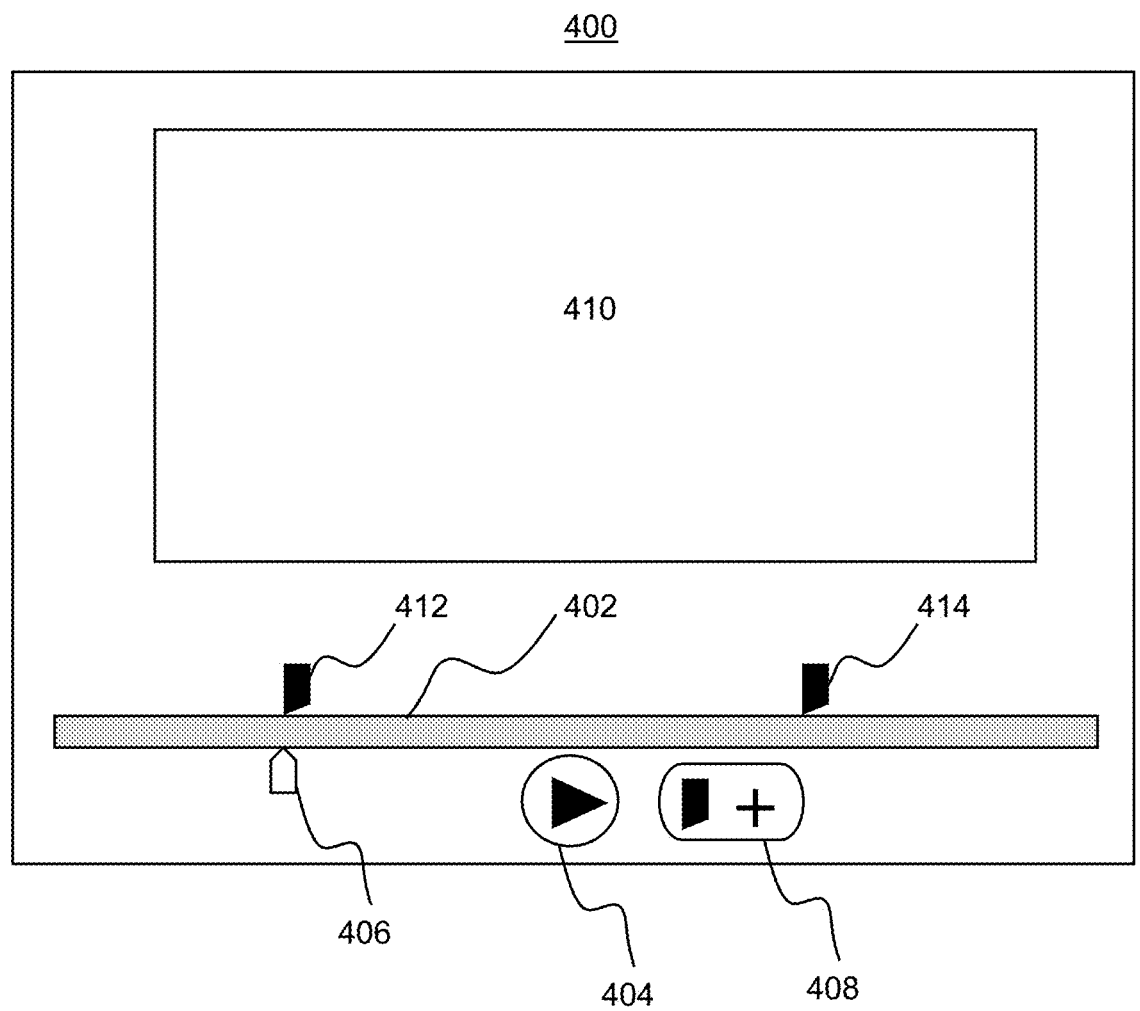
FIG. 4 illustrates an example user interface for synchronizing information for videos.

FIG. 4 illustrates an example user interface for synchronizing information for videos 400. The user interface 400 may include a playback portion 410, a progress bar 402, a play button 404, a playback position marker 406, a synchronization marker insertion button 408, and synchronization markers 412, 414. The playback portion 410 may provide a view of visual content of the video. For example, the playback portion 410 may provide a view of stabilized visual content of the video. The progress bar 402 may represent the progress length of the video. User may interact with the play button 404 to cause playback of the visual content within the playback portion 410. The playback position marker 406 may indicate current playback position for the visual content. User may interact with the synchronization marker insertion button 408 to add a synchronization marker for the video (at a moment corresponding to the playback position marker 406). User interaction with the synchronization marker insertion button 408 may cause analysis of video frames and rotational positions near the playback position marker 406 to identify the points along the rotational position track and the visual track to be fixed for temporal alignment. The synchronization markers 412, 414 may indicate locations of the synchronization markers for the video.

Figure 5:
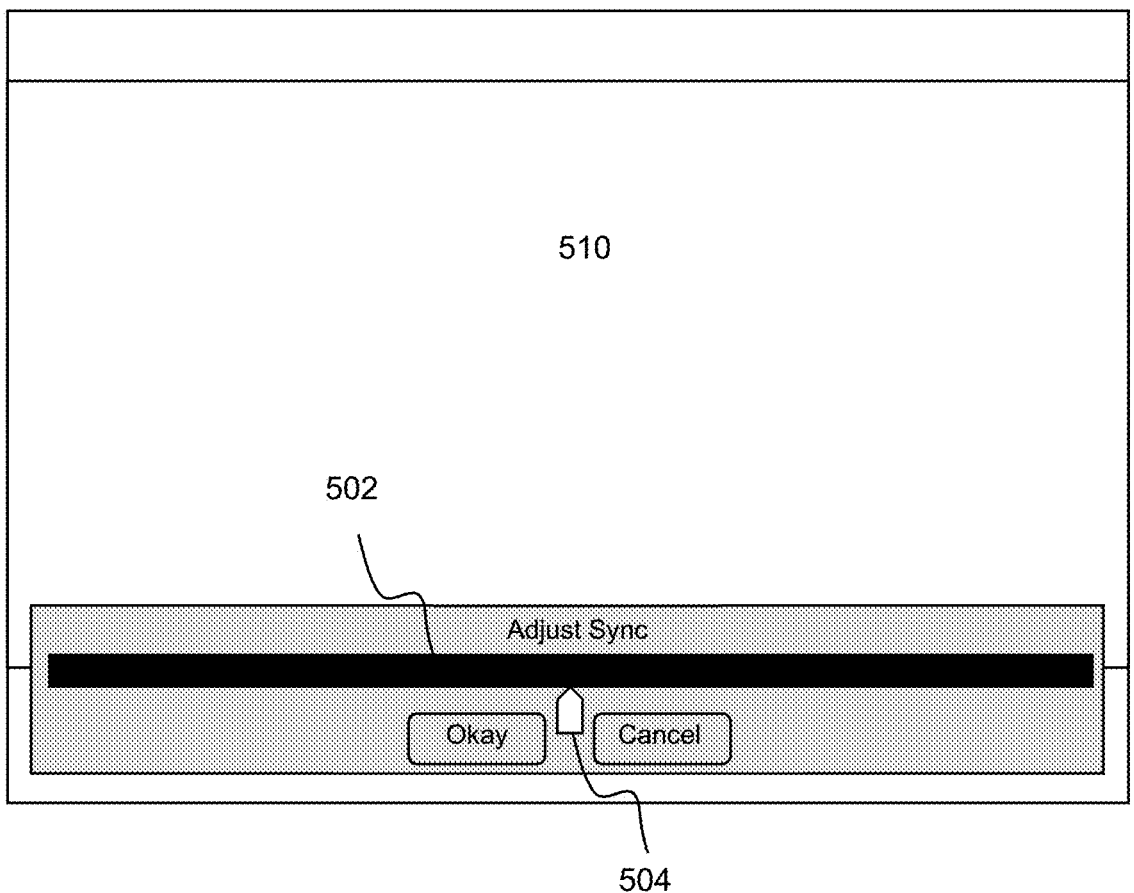
FIG. 5 illustrates an example user interface for synchronizing information for videos.

FIG. 5 illustrates an example user interface for synchronizing information for videos 500. The user interface 500 may enable user modification of the timing of information stored within one or more track. For example, the user interface 500 may enable user modification of the timing of the rotational positions stored in the rotational position track. In some implementations, the user interface 500 may be provided with respect to a synchronization marker. For example, a user may have interacted with an option of the user interface 400 to adjust the synchronization of the visual position track with respect to one of the synchronization markers 412, 414.

The user interface 500 may include a playback portion 510, a synchronization adjustment bar 502, and a synchronization adjustment slider 504. The playback portion 510 may provide a view of visual content of the video. For example, the playback portion 510 may provide a looping stabilized view of subset of video frames. The playback portion 510 may provide a repeating view of a punchout of the subset of the video frames. The synchronization adjustment bar 502 and/or the synchronization adjustment slider 504 may form/be part of a synchronization adjustment option. As shown in FIG. 5, the synchronization adjustment option may include a slider (e.g., the synchronization adjustment slider 504) that is movable between two ends (e.g., the left end and right end of the synchronization adjustment bar 502). Other types and configurations of synchronization adjustment option are contemplated.

User may interact with the synchronization adjustment slider 504 to modify the timing of the rotational positions stored in the rotational position track. User may interact with the synchronization adjustment slider 504 by moving the synchronization adjustment slider 504 along a position along the synchronization adjustment bar 502.

For example, user may move the synchronization adjustment slider 504 between the two ends of the synchronization adjustment bar 502 to adjust the video times associated with the rotational positions in the rotational position track. For instance, moving the synchronization adjustment slider 504 towards the left end may cause a point in the rotational position track to be synchronized to an earlier point in the visual track.

User may move the synchronization adjustment slider 504 between the two ends of the synchronization adjustment bar 502 to change the speed of the rotational position track adjacent to a synchronization marker (the synchronization markers 412, 414). For instance, the user interface 500 may be provided with respect to the synchronization marker 412, and user may move the synchronization adjustment slider 504 between the two ends of the synchronization adjustment bar 502 to change the speed of the rotational position track preceding the synchronization marker 412 and/or the speed of the rotational position track between the synchronization markers 412, 414.

For example, responsive to the synchronization adjustment slider 504 being moved towards the left end, the speed of the rotational position track preceding the synchronization marker 412 may be increased. Responsive to the synchronization adjustment slider 504 being moved towards the right end, the speed of the rotational position track preceding the synchronization marker 412 may be decreased. For example, every rotational position in the rotational position track preceding the synchronization marker 412 may have been be synchronized to every tenth video frame in the visual track. Moving the synchronization adjustment slider 504 towards the left end may change rotational positions in the rotational position track preceding the synchronization marker 412 to be synchronized to every ninth video frame in the visual track. Moving the synchronization adjustment slider 504 towards the right end may change rotational positions in the rotational position track preceding the synchronization marker 412 to be synchronized to every eleventh video frame in the visual track.

In some implementations, the speed of the rotational position track on both sides of the synchronization marker may be changed. The change in speed of the rotational position track on one side of the synchronization marker may be inverse of the change in speed of the rotational position track on the other side of the synchronization marker. For example, responsive to the synchronization adjustment slider 504 being moved towards the left end, the speed of the rotational position track following the synchronization marker 412 may be decreased. Responsive to the synchronization adjustment slider 504 being moved towards the right end, the speed of the rotational position track following the synchronization marker 412 may be increased.

Figure 6:
FIG. 6 illustrates an example synchronized visual track and rotational position track.

FIG. 6 illustrates an example synchronized visual track and rotational position track. FIG. 6 includes example visualization of fifteen video frames stored in a visual track 602 and fifteen rotational positions of image capture device stored in a rotational position track 604. The fifteen rotational positions may reflect the rotational positions of the image capture device at moments when the fifteen video frames were captured by the image capture device. Information contained within the visual track 602 and the rotational position track 604 may be temporally aligned such that the fifteen video frames are temporally aligned with the fifteen corresponding rotational positions.

The timing of information contained within the visual track 602 and the rotational position track 604 may be synchronized based on user interaction with a synchronization adjustment option. For example, user interaction with a synchronization adjustment option may cause retiming of information contained within the rotational position tracks 304, 314, 324 (shown in FIGS. 3A, 3B, and 3C) to arrive at synchronization shown in FIG. 6. For example, rotational positions in the rotational position track 304 in FIG. 3A may be shifted to earlier time positions to temporally align the video frames with the corresponding rotational positions. The speed of the rotational positions in the rotational position track 314 in FIG. 3B may be slowed down to temporally align the video frames with the corresponding rotational positions. The speed of the rotational positions in first half of the rotational position track 324 in FIG. 3C may be increased and the speed of the rotational positions in second half of the rotational position track 324 may be decreased to temporally align the video frames with the corresponding rotational positions. Other retiming of information within tracks are contemplated.

Figure 7A:
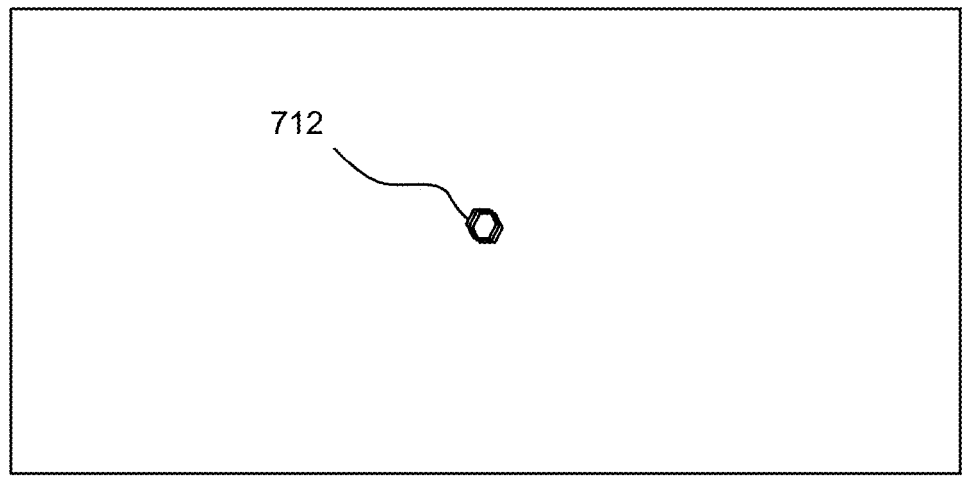
FIGS. 7A, 7B, 7C, and 7D illustrate example looping stabilized views of video frames.

FIGS. 7A, 7B, 7C, and 7D illustrate example looping stabilized views of video frames. In FIG. 7A, a looping stabilized view 702 may include a view of the punchout of the video frames. The punchout of the video frames may provide stabilization for the video frames. Temporal misalignment between the visual track and the rotational position track may cause a depiction of an object 712 to move (e.g., shake) within the looping stabilized view 702.

Figure 7B:
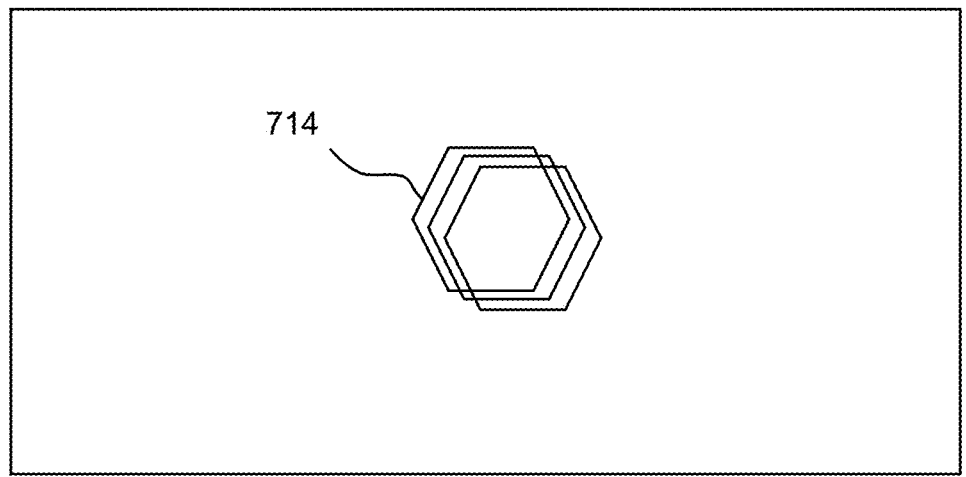
Figure 7C:
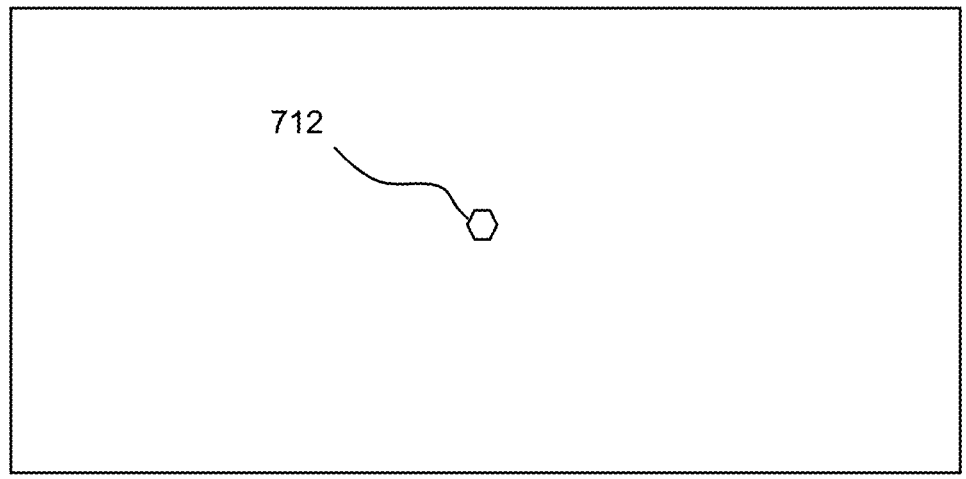
Figure 7D:
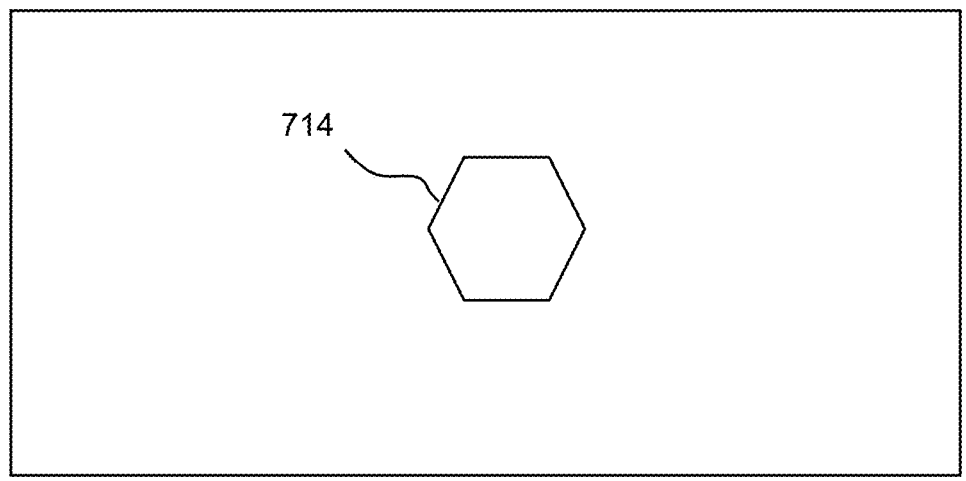

In FIG. 7B, a zoomed looping stabilized view 704 may include a zoomed view of a portion of the punchout of the video frames. The zoomed view of the portion of the punchout may provide an enlarged view of the depiction of the object 712. The zoomed looping stabilized view 704 may make movement of the depiction of an object 712 more evident than the looping stabilized view 702. The zoomed looping stabilized view 704 may make it easier for a user to observe the affect of the rotational position track retiming on stabilization of the visual content.

By seeing whether the looping stabilized view is being more/less stabilized in response to user interaction with the synchronization adjustment option, the user may be able to determine whether and/or when the rotational position track has been accurately synchronized to the visual track. For example, the user may interact with the synchronization adjustment option so that the depiction of the object 712 does not move within the looping stabilized view 702 (shown in FIG. 7C). The user may interact with the synchronization adjustment option so that the depiction of the object 714 does not move within the zoomed looping stabilized view 704 (shown in FIG. 7D). Thus, the looping stabilized view may enable a user to change modify time-alignment of the rotational position track with the visual track while seeing the affects of the rotational position track retiming on stabilization of the visual content.

In some implementations, the zoomed looping stabilized view 704 may be presented based on user interaction with the looping stabilized view 702. For example, the zoomed looping stabilized view 704 may be presented based on the user moving a cursor/pointer to the looping stabilized view 702 and then interacting with a zoom option (e.g., moving a mouse while holding Z on a keyboard/moving a scroll wheel on a mouse).

While certain implementations of the disclosure has been described with respect to synchronization between rotational position track and visual track, this is merely as example and is not meant to be limiting. For example, presentation of a looping view of a subset of video frames and use of a synchronization adjustment option to modify timing of associated information stored within a track may be utilized to synchronize the visual track with other types of tracks. For example, timing of audio track for a video may be modified using the present disclosure to synchronize the audio track with the visual track. In such implementations, the looping view of a subset of video frames may be presented with a short duration of the audio content, and change in temporal alignment of the audio track with the visual track may change the moments of the looping view at which sounds in the audio track are heard. As another example, timing of another visual track may be modified using the present disclosure to synchronize two visual tracks. In such implementations, multiple looping views of subsets of video frames (of separate visual content) may be presented, and change in temporal alignment of one visual track with the other visual track may change when moments within the separate visual content are synchronized (e.g., for presentation at the same time, for switching between presentation of one visual content to the other visual content). Synchronization of other types of information are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
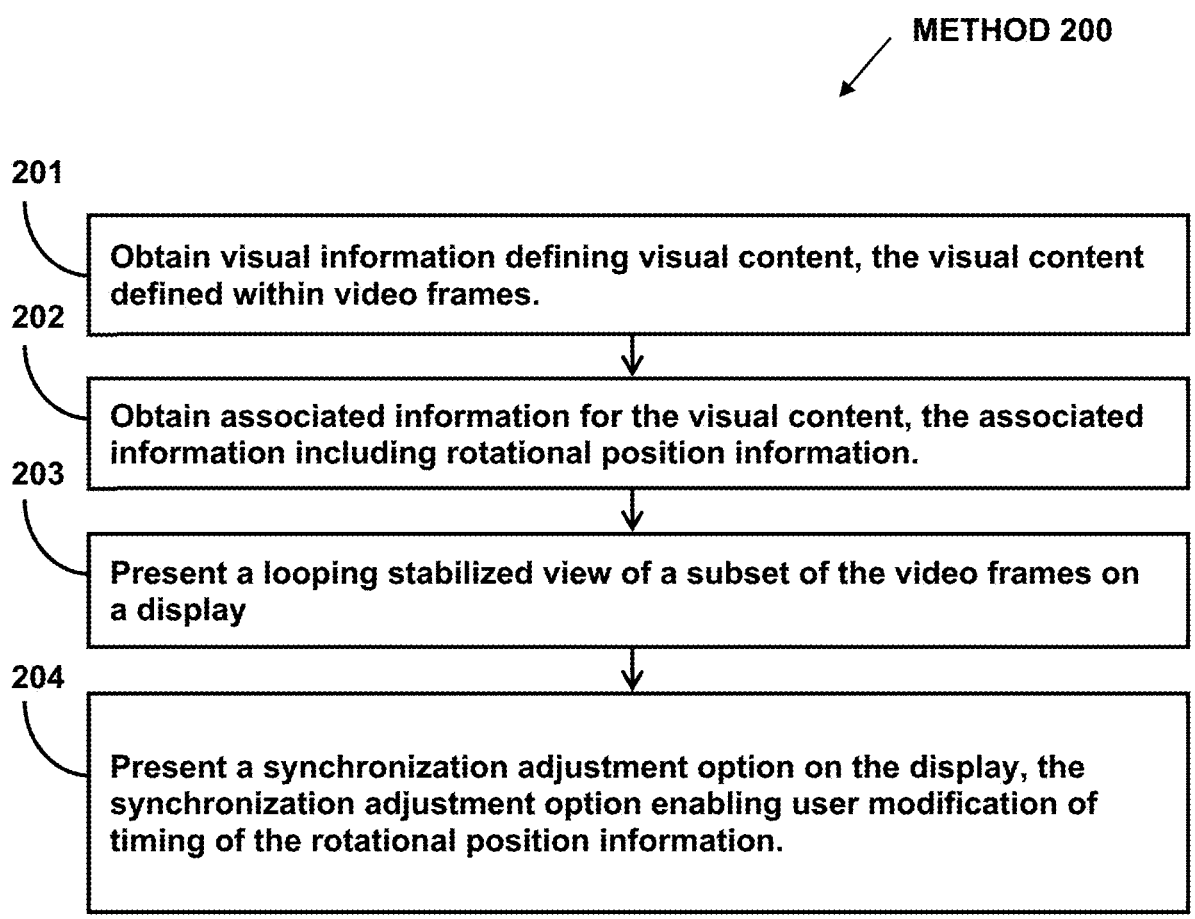
FIG. 2 illustrates an example method for synchronizing information for videos.

FIG. 2 illustrates method 200 for synchronizing information for videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information defining visual content may be obtained. The visual content may be captured by an image capture device during a capture duration. The visual content may be defined within video frames. The video frames may include a first video frame captured at a first moment within the capture duration, and/or other video frames. The visual information may be stored in a visual track. In some implementation, operation 201 may be performed by a processor component the same as or similar to the visual information component 102 (Shown in FIG. 1 and described herein).

At operation 202, associated information for the visual content may be obtained. The associated information may include rotational position information and/or other information. The rotational position information may characterize rotational positions of the image capture device during the capture duration. The rotational positions of the image capture device may include a first rotational position of the image capture device at the first moment within the capture duration, and/or other rotational positions. The rotational position information may be stored in a rotational position track. The rotational position information may be stored at a different rate than the visual information such that the first rotational position of the image capture device stored within the rotational position track is not temporally aligned with the first video frame stored within the visual track. In some implementation, operation 202 may be performed by a processor component the same as or similar to the associated information component 104 (Shown in FIG. 1 and described herein).

At operation 203, a looping stabilized view of a subset of the video frames may be presented on a display. The looping stabilized view of the subset of the video frames may include a repeating view of a punchout of the subset of the video frames. The punchout of the subset of the video frames may provide stabilization for the subset of the video frames. The punchout of the subset of the video frames may be determined based on temporal alignment of the rotational position track with the visual track and/or other information. In some implementation, operation 203 may be performed by a processor component the same as or similar to the view component 106 (Shown in FIG. 1 and described herein).

At operation 204, a synchronization adjustment option may be presented on the display. The synchronization adjustment option may enable user modification of timing of the rotational position information stored within the rotational position track. The timing of the rotational position information stored within the rotational position track may be modified based on user interaction with the synchronization adjustment option. The modification of the timing of the rotational position information stored within the rotational position track may change the temporal alignment of the rotational position track with the visual track. The change in the temporal alignment of the rotational position track with the visual track may change the looping stabilized view of the subset of the video frames. In some implementation, operation 204 may be performed by a processor component the same as or similar to the synchronization component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for synchronizing information for videos, the system comprising:
one or more physical processors configured by machine-readable instructions to:
obtain visual information defining visual content, the visual content captured by an image capture device during a capture duration, the visual content defined within video frames, wherein the visual information is stored in a visual track;
obtain associated information for the visual content, the associated information for the visual content including information associated with the visual content, wherein the associated information is stored in a track separate from the visual track, the associated information stored at a different rate than the visual information such that temporal misalignment exists between the associated information stored within the separate track and the visual information stored within the visual track, the separate track including a first portion and a second portion, the first portion of the separate track corresponding to a first portion of the visual track and the second portion of the separate track corresponding to a second portion of the visual track, wherein rate of information storage in the separate track changes during the capture duration and causes:
speed of the associated information in the first portion of the separate track to be slower than speed of the visual information in the first portion of the visual track and the speed of the associated information in the second portion of the separate track to be faster than speed of the visual information in the second portion of the visual track; or the speed of the associated information in the first portion of the separate track to be faster than speed of the visual information in the first portion of the visual track and the speed of the associated information in the second portion of the separate track to be slower than speed of the visual information in the second portion of the visual track; and present a synchronization adjustment option on the display, the synchronization adjustment option enabling user modification of timing of the associated information stored within the separate track, wherein the timing of the associated information stored within the separate track is modified based on user interaction with the synchronization adjustment option, the modification of the timing of the associated information stored within the separate track changing temporal alignment of the separate track with the visual track to enable user synchronization of the visual information with the associated information, wherein the modification of the timing of the associated information stored within the separate track includes change in the speed of the associated information in the first portion of the separate track and the second portion of the separate track, wherein change in the speed of the associated information in the first portion of the separate track is inverse of change in the speed of the associated information in the second portion of the separate track, wherein:

the speed of the associated information in the first portion of the separate track is increased while the speed of the associated information in the second portion of the separate track is decreased; or the speed of the associated information in the first portion of the separate track is decreased while the speed of the associated information in the second portion of the separate track is increased.

2. The system of claim 1, wherein the synchronization adjustment option is activated with respect to a synchronization marker, the synchronization marker defining an instance of a fixed temporal alignment between a point between the first portion of the visual track and the second portion of the visual track and a point between the first portion of the separate track and the second portion of the separate track.

3. The system of claim 2, wherein the synchronization adjustment option includes a slider movable between a first end and a second end.

4. The system of claim 3, wherein movement of the slider between the first end and the second end causes the change in the speed of the associated information in the first portion of the separate track and the second portion of the separate track.

5. The system of claim 4, wherein responsive to the slider being moved towards the first end, the speed of the first portion of the separate track preceding the synchronization marker is increased.

6. The system of claim 5, wherein responsive to the slider being moved towards the second end, the speed of the first portion of the separate track preceding the synchronization marker is decreased.

7. The system of claim 6, wherein responsive to the slider being moved towards the first end, the speed of the second portion of the separate track following the synchronization marker is decreased.

8. The system of claim 7, wherein responsive to the slider being moved towards the second end, the speed of the second portion of the separate track following the synchronization marker is increased.

9. The system of claim 1, the visual information is stored at a consistent rate such that a single video frame is stored for a time duration.

10. A method for synchronizing information for videos, the method performed by a computing system including one or more processors, the method comprising:

obtaining, by the computing system, visual information defining visual content, the visual content captured by an image capture device during a capture duration, the visual content defined within video frames, wherein the visual information is stored in a visual track;

obtaining, by the computing system, associated information for the visual content, the associated information for the visual content including information associated with the visual content, wherein the associated information is stored in a track separate from the visual track, the associated information stored at a different rate than the visual information such that temporal misalignment exists between the associated information stored within the separate track and the visual information stored within the visual track, the separate track including a first portion and a second portion, the first portion of the separate track corresponding to a first portion of the visual track and the second portion of the separate track corresponding to a second portion of the visual track, wherein rate of information storage in the separate track changes during the capture duration and causes:

speed of the associated information in the first portion of the separate track to be slower than speed of the visual information in the first portion of the visual track and the speed of the associated information in the second portion of the separate track to be faster than speed of the visual information in the second portion of the visual track; or the speed of the associated information in the first portion of the separate track to be faster than speed of the visual information in the first portion of the visual track and the speed of the associated information in the second portion of the separate track to be slower than speed of the visual information in the second portion of the visual track;

and presenting, by the computing system, a synchronization adjustment option on the display, the synchronization adjustment option enabling user modification of timing of the associated information stored within the separate track, wherein the timing of the associated information stored within the separate track is modified based on user interaction with the synchronization adjustment option, the modification of the timing of the associated information stored within the separate track changing temporal alignment of the separate track with the visual track to enable user synchronization of the visual information with the associated information, wherein the modification of the timing of the associated information stored within the separate track includes change in the speed of the associated information in the first portion of the separate track and the second portion of the separate track, wherein change in the speed of the associated information in the first portion of the separate track is inverse of change in the speed of the associated information in the second portion of the separate track, wherein:

the speed of the associated information in the first portion of the separate track is increased while the speed of the associated information in the second portion of the separate track is decreased; or the speed of the associated information in the first portion of the separate track is decreased while the speed of the associated information in the second portion of the separate track is increased.

11. The method of claim 10, wherein the synchronization adjustment option is activated with respect to a synchronization marker, the synchronization marker defining an instance of a fixed temporal alignment between a point between the first portion of the visual track and the second portion of the visual track and a point between the first portion of the separate track and the second portion of the separate track.

12. The method of claim 11, wherein the synchronization adjustment option includes a slider movable between a first end and a second end.

13. The method of claim 12, wherein movement of the slider between the first end and the second end causes the change in the speed of the associated information in the first portion of the separate track and the second portion of the separate track.

14. The method of claim 13, wherein responsive to the slider being moved towards the first end, the speed of the first portion of the separate track preceding the synchronization marker is increased.

15. The method of claim 14, wherein responsive to the slider being moved towards the second end, the speed of the first portion of the separate track preceding the synchronization marker is decreased.

16. The method of claim 15, wherein responsive to the slider being moved towards the first end, the speed of the second portion of the separate track following the synchronization marker is decreased.

17. The method of claim 16, wherein responsive to the slider being moved towards the second end, the speed of the second portion of the separate track following the synchronization marker is increased.

18. The method of claim 10, the visual information is stored at a consistent rate such that a single video frame is stored for a time duration.

19. A system for synchronizing information for videos, the system comprising:

one or more physical processors configured by machine-readable instructions to:

obtain visual information defining visual content, the visual content captured by an image capture device during a capture duration, the visual content defined within video frames, wherein the visual information is stored in a visual track;

obtain associated information for the visual content, the associated information for the visual content including information associated with the visual content, wherein the associated information is stored in a track separate from the visual track, the associated information stored at a different rate than the visual information such that temporal misalignment exists between the associated information stored within the separate track and the visual information stored within the visual track, the separate track including a first portion and a second portion, the first portion of the separate track corresponding to a first portion of the visual track and the second portion of the separate track corresponding to a second portion of the visual track, wherein rate of information storage in the separate track changes during the capture duration and causes:

speed of the associated information in the first portion of the separate track to be slower than speed of the visual information in the first portion of the visual track and the speed of the associated information in the second portion of the separate track to be faster than speed of the visual information in the second portion of the visual track; or the speed of the associated information in the first portion of the separate track to be faster than speed of the visual information in the first portion of the visual track and the speed of the associated information in the second portion of the separate track to be slower than speed of the visual information in the second portion of the visual track; and present a synchronization adjustment option on the display, the synchronization adjustment option includes a slider movable between a first end and a second end, the synchronization adjustment option enabling user modification of timing of the associated information stored within the separate track, wherein the timing of the associated information stored within the separate track is modified based on user interaction with the synchronization adjustment option, the modification of the timing of the associated information stored within the separate track changing temporal alignment of the separate track with the visual track to enable user synchronization of the visual information with the associated information, wherein the synchronization adjustment option is activated with respect to a synchronization marker, the synchronization marker defining an instance of a fixed temporal alignment between a point between the first portion of the visual track and the second portion of the visual track and a point between the first portion of the separate track and the second portion of the separate track, the modification of the timing of the associated information stored within the separate track includes change in the speed of the associated information in the first portion of the separate track and the second portion of the separate track, wherein change in the speed of the associated information in the first portion of the separate track is inverse of change in the speed of the associated information in the second portion of the separate track, wherein:

the speed of the associated information in the first portion of the separate track is increased while the speed of the associated information in the second portion of the separate track is decreased; or the speed of the associated information in the first portion of the separate track is decreased while the speed of the associated information in the second portion of the separate track is increased.

20. The system of claim 19, wherein responsive to the slider being moved towards the first end, the speed of the first portion of the separate track preceding the synchronization marker is increased and the speed of the second portion of the separate track following the synchronization marker is decreased.

* * * * *